US007309007B2

(12) United States Patent
Kean

(10) Patent No.: US 7,309,007 B2
(45) Date of Patent: Dec. 18, 2007

(54) SYSTEMS AND METHODS FOR PERSONALIZING TRANSACTION CARDS

(75) Inventor: Brian Kean, Missouri Valley, IA (US)

(73) Assignee: First Data Corporation, Greenwood Village, CO (US)

( * ) Notice: Subject to any disclaimer, the term of this patent is extended or adjusted under 35 U.S.C. 154(b) by 246 days.

(21) Appl. No.: 11/243,588

(22) Filed: Oct. 4, 2005

(65) Prior Publication Data

US 2007/0075132 A1   Apr. 5, 2007

(51) Int. Cl.
*G06K 5/00* (2006.01)
(52) U.S. Cl. .................. 235/380; 235/449; 235/453; 235/475; 235/492
(58) Field of Classification Search ........... 235/439, 235/453, 486, 475
See application file for complete search history.

(56) References Cited

U.S. PATENT DOCUMENTS

| 6,688,529 | B1 * | 2/2004 | Goade, Sr. ................... 235/488 |
| 6,761,319 | B2 * | 7/2004 | Peachman et al. .......... 235/492 |
| 6,827,264 | B2 * | 12/2004 | Morgavi ...................... 235/451 |
| 7,234,637 | B2 * | 6/2007 | Berthe ......................... 235/380 |

* cited by examiner

*Primary Examiner*—Seung Ho Lee
(74) *Attorney, Agent, or Firm*—Townsend and Townsend and Crew LLP

(57) ABSTRACT

A system for personalizing a plurality of transaction cards comprises an array of shells that are adapted to engage a sheet having a plurality of transaction cards. Each of the shells comprises an antenna adapted for transmitting data onto one of the cards. An orientation detector is used to determine the orientation of the sheet relative to the array of shells. A controller is used to direct operation of the antenna so that data may be recorded on the cards.

29 Claims, 8 Drawing Sheets

SYSTEMS AND METHODS FOR PERSONALIZING TRANSACTION CARDS

BACKGROUND OF THE INVENTION

The invention relates generally to the field of transaction cards, and in particular to the production of such cards. More specifically, the invention relates to the initializing or personalization of such cards before being sent to a user.

Transaction cards, such as credit cards, debit cards, ATM cards, bank cards, etc., are increasingly replacing other types of tender in consumer transactions. In addition, vendors and merchants are issuing ever more types of transaction cards, such as loyalty cards, gift cards, stored valued cards, etc., for sales promotions and the cultivation of customer loyalty. As a result, consumers are struggling to find more room in their wallets and carrying cases to store an expanding assortment of transaction cards.

While consumers juggle increasing numbers of transaction cards, they still generally rely on a small subset of cards for most of their purchases. For example, a consumer may use a favorite credit card for most purchases, and rarely use other credit cards, debit cards, stored value cards, etc. For this subset of frequently used cards, consumers desire fast and easy card accessibility relative to the rest of the cards they carry.

One way to improve accessibility of frequently used cards is by allowing them to be stored in a separate location from the traditional wallet or carrying case. Such cards could be stored on key-chains, lanyards, hooks, or other similar devices that are easily retrieved from a bag or pocket. Thus, when a consumer needs to use the card during a transaction, the card may be quickly retrieved and given to the merchant. This provides an added level of convenience to the consumer by making the payment process quicker and simpler. Additionally, the merchant is able to move customers through the line more quickly, improving customer satisfaction. Another benefit is that frequently used cards stored on a key-chain or like device are less likely to be lost. This is because a single card is much more easily misplaced than a card attached to a key-chain.

Conventionally sized cards, however, are too large and cumbersome to be conveniently stored on a key-chain or like device. The individual items on a key chain should be small and compact so that the key-chain can accommodate numerous items. Further, key-chains and the like are often placed in the pockets of clothing, which may be small. Finally, larger items, such as conventional credit cards, could be bent or otherwise damaged when stored on a device such as a key-chain. Thus, for a card to be effectively carried on a key-chain, its size must be significantly reduced.

For conventional contact transaction cards, the degree to which the card may be reduced in size or changed in shape is limited by the requirements of the contact interface. For example, many conventional transaction cards having a magnetic stripe that contacts a stripe reader on a point-of-sale ("POS") terminal when a user "swipes" the card to make a purchase or payment. In order to ensure interoperability between the magnetic stripe readers and cards bearing magnetic stripes, the parameters defining the magnetic stripe are governed by the International Organization for Standardization (ISO) and the International Electrotechnical Commission (IEC). ISO/IEC 7811 provides standards for the physical characteristics of the magnetic stripe including the location of the stripe on the card, the surface profile of the stripe, and the height of the stripe above the card surface. Conforming to the standard requires significant restrictions on the size and shape of the transaction card.

Transaction cards with non-standard shapes and sizes also present difficulties for merchants and service providers trying to attract the attention of consumers in a crowded and competitive market for such cards. Small sized cards, for example, are difficult to see at a distance, and have a more limited surface space for branding and advertisements. Cards with odd shapes can be difficult to package and display. Thus, there is a need for a transaction card solution that permits the cards to have a wide range of forms (including forms that do not conform to the ISO/IEC 7811 standard) while also being easy for merchants, vendors, service providers, etc. to package and display.

BRIEF SUMMARY OF THE INVENTION

The present invention relates generally to the personalization or initialization of transaction cards with various kinds of account information. Such cards may include electronics for storing such data, such as a contactless payment chip, although other contactless memory and/or integrated circuit chips could be used as well. The invention provides systems and methods that permit such data to be recorded on the cards in a highly efficient manner. In some cases, multiple cards may be initialized at the same time.

In one specific implementation, the present invention provides systems and methods for personalizing a plurality of transaction cards. In one such embodiment, the system includes an array of shells adapted to engage a sheet having a plurality of transaction cards. Each of the shells include an antenna adapted for transmitting data to one of the cards. The system includes an orientation detector adapted for determining an orientation of the sheet relative to the array of shells, and a controller. The controller is coupled to the array of shells and is adapted for directing operation of the antennas.

In some aspects, the system also includes a base adapted to engage an opposing surface of the sheet of transaction cards so that the sheet is disposed between the base and the array of shells. The base may be a generally flat base, and may be made from material adapted to reduce or eliminate the likelihood that transmissions from the antenna will escape the shell when the shell array engages the sheet of cards. In some aspects, the base includes a second array of shells, with at least one of the shells in the second array having an antenna adapted for transmitting data to one of the cards.

In some aspects, the system includes a database coupled to the controller. The database includes data to be transmitted to the cards. The data may include a range of information, including without limitation a customer name, account number, account limitations (e.g., spending limitations), and the like. In other aspects, the controller is adapted to direct transmissions from at least some of the antennas to at least some of the transaction cards simultaneously. In this manner, the system can personalize a number of cards at the same time with the appropriate data. The transaction cards may include a contactless integrated circuit, which receives the transmitted data. The circuit may be adapted to communicate with a card reader, such as a point-of-sale device.

In some aspects, the system includes a reader adapted to read an indicator disposed on the sheet of transaction cards. The indicator may include, for example, a bar code readable by a bar code reader. The bar code may contain information on the sheet, and may further contain information on the specific transaction cards which make up a part of the sheet.

In some aspects, the system includes a transceiver coupled to the controller and to the array of shells. The transceiver is adapted to transmit data to at least some of the antennas for transmission to at least some of the transaction cards. In a particular aspect, the transceiver includes a radio transceiver and the antennas are RF antennas.

In some aspects, at least one of the shells include a reflector adapted to reflect a transmission from the antenna towards one of the cards. The reflector may be a parabolic reflector, and/or the shells may be parabolic shells in some embodiments. In some aspects, the shells further include a shield adapted to prevent transmission interference from antennas in adjacent shells. In a particular aspect, at least some of the shells include an electrically non-conductive body having a Faraday cage.

In another embodiment of the present invention, a system for personalizing a transaction card includes a controller and a shell. The shell has a first half and a second half, with the first half including an antenna coupled to the controller. The antenna is adapted for transmitting data to the transaction card. A card holder is included, and is adapted to hold a transaction card between the first shell half and the second shell half. The first and second halves each have a shield adapted to prevent the transmission of data through the shell halves, and are adapted to close around the transaction card prior to operation of the antenna.

In some aspects, the antenna includes an RF antenna, and the transaction card includes a radio frequency identification (RFID). In other aspects, the two halves are rotatably coupled together. This may involve, for example, a hinge coupling the two halves together at a rotation point along an interface of the first and second halves.

The present invention also provides methods for personalizing one or more transaction cards. One such method includes providing a sheet having a plurality of transaction cards, and engaging a first surface of the sheet with an array of shells, with at least some of the shells having an antenna adapted for transmitting data. The engagement between the sheet and shell array operates so that the shells are aligned with the transaction cards. The method includes identifying a plurality of data sets, with each data set intended to be transferred to one of the transaction cards, and engaging the antennas to transfer the plurality of data sets to the transaction cards.

In some aspects, the method includes engaging a second surface of the sheet with a base. The base may include a second array of shells in some aspects. Some methods further include determining an orientation of the sheet relative to the array of shells, and/or reading a sheet identifier from the sheet. In some aspects, the methods include transmitting the sheet identifier to a controller, where the controller identifies the plurality of data sets based at least in part on the sheet identifier.

In some aspects, the method further includes separating the transaction cards from the sheet, and/or printing information on the transaction cards. The printing may occur before or after the cards are separated from the sheet in alternative embodiments. In some aspects, the information printed on the cards may include, without limitation, a customer name, an account number, a bar code, and a card issuer identifier. The methods may further include verifying that the information printed on the transaction card matches the data set transferred to the card by the antenna.

Other objects, features and advantages of the present invention will become more fully apparent from the following detailed description, the appended claims, and the accompanying drawings.

DETAILED DESCRIPTION OF THE INVENTION

The invention includes transaction card assembly that includes a transaction card which is detachable from a surrounding sheet. The sheet may have a size and shape that is easy to package and display, as well as one or more surfaces on which branding and advertising may be prominently displayed. The transaction card may have a standard or non-standard shape and size, and includes a contactless integrated circuit that allows transactions to be conducted without physical contact between the card and transaction processing device at the point of sale. Because the transaction may be contactless, the transaction card does not have to be limited only to shapes and sizes dictated by the ISO/IEC 7811 standard for contact transaction cards.

Figure 1A:
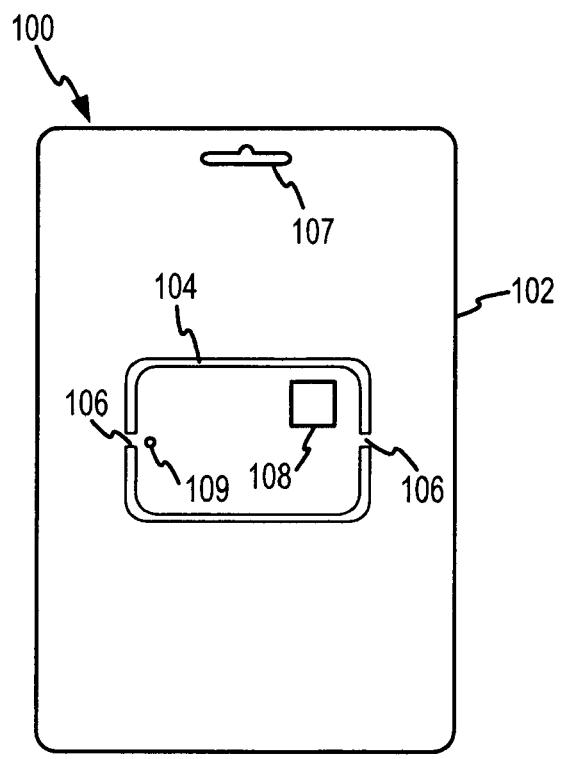
FIGS. 1A-1F show plan views of transaction card assemblies for use with the present invention.

FIGS. 1A-1D show embodiments of transaction card assemblies according to embodiments of the invention. FIG. 1A shows a transaction card assembly 100 that includes a sheet 102 surrounding and attached to a transaction card 104. The sheet 102 and transaction card 104 are coupled by connecting tabs 106 that may be formed by punching, scoring, ablating, etc. portions of the sheet 102 around the transaction card 104. The tabs 106 can be manually broken to detach the card 104 from the sheet 102. For example, flexural forces may be applied to the card 104 in order to weaken and ultimately break the connecting tabs 106.

The sheet 102 may be made out of the same material as the transaction card 104, and may include conventional transaction card materials such as plastics, polymers, paper, and the like. The shape of the sheet 102 may be selected for easy packaging and display.

Sheet 102 may be formed with an integrated holder such as one or more apertures like aperture 107 for suspending the sheet from a display hook (e.g., a J-peg holder mounted on a wall or countertop display or some other type of display rack or suspension system). In some embodiments, the sheet 102 may include a pair of collinearly positioned J-peg apertures (not shown), spaced apart to accept a dual-pronged display hook. As shown in FIGS. 1A-1D, the apertures may have a variety of shapes and sizes such as round, triangular, square, rectangular, diamond shaped, etc.

The transaction card 104 may also include an aperture 109. Transaction cards may have a single aperture, like transaction card 104, or a plurality of apertures with the same or different shapes. The shape of the apertures may be circular, elliptical, hemispherical, square, rectangular, triangular, polygonal, etc. The inside edge of the aperture may also be reinforced to reduce the chance of the aperture tearing or splitting, for example when the aperture is linked to a keychain ring. Reinforcement of the aperture may be provided by metal or hard plastic collar (not shown) secured to the inside edge of the aperture.

The aperture 109 may also be designed for coupling the transaction card 104 to a protective cover or carrying case (not shown). For example, the aperture 109 may be designed to accept a fastener, such as a pin, that secures the card to the cover. The card may be swung in and out of the holder in a jack-knife motion where the card does not completely detach from the holder.

The apertures in the transaction cards may have an ascetic function. For example, a plurality of apertures in the card may be arranged into a distinctive pattern that serves as a way to brand the card, or a merchant, vender, service provider, etc. associated with the card. Whether apertures are functional, ascetic, or a combination of both, they may be spaced a distance from the contactless integrated circuit or card identifying media so as not to interfere with the function of those elements. For example, an aperture formed in the card may be spaced about 1/16 of an inch or more from these elements.

The transaction card 104 also includes an contactless integrated circuit chip 108, which may include a wireless transmitter and/or receiver for exchanging information with a transaction card reader. The chip 108 may include an antenna for transmitting and receiving information associated with the transaction on a modulated RF carrier signal. The contactless IC chip 108 may be designed to conform to ISO/IEC standards for contactless integrated circuit cards and proximity cards, including the ISO/IEC 14443 standard, and/or the ISO/IEC 15693 standard, among others.

A transaction may be conducted by positioning the transaction card 104 a proximate distance from the point of sale device capable of receiving a signal from the card. Embodiments also include having the point of sale device transmit a signal to the card, such as a handshake signal instructing the card to start transmitting data that can be used to process the transaction. The POS device may also transmit signals with information about the transaction or debit account associated with the card for storage on the card. For example, when the transaction card 104 conforms to the ISO/IEC 14443 standard, a POS device (not shown) may send and receive messages about the transaction via a modulated RF field that has a carrier frequency of 13.56 MHz.

Figure 1B:
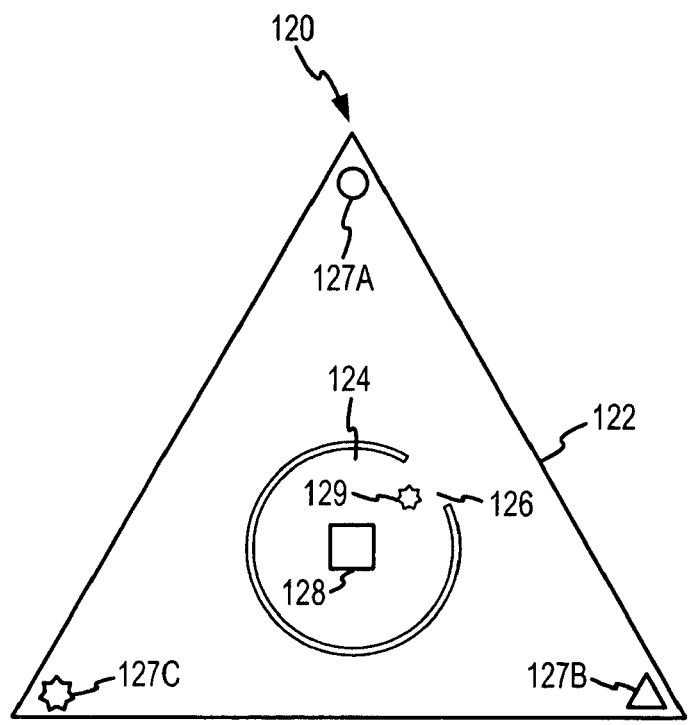
Figure 1C:
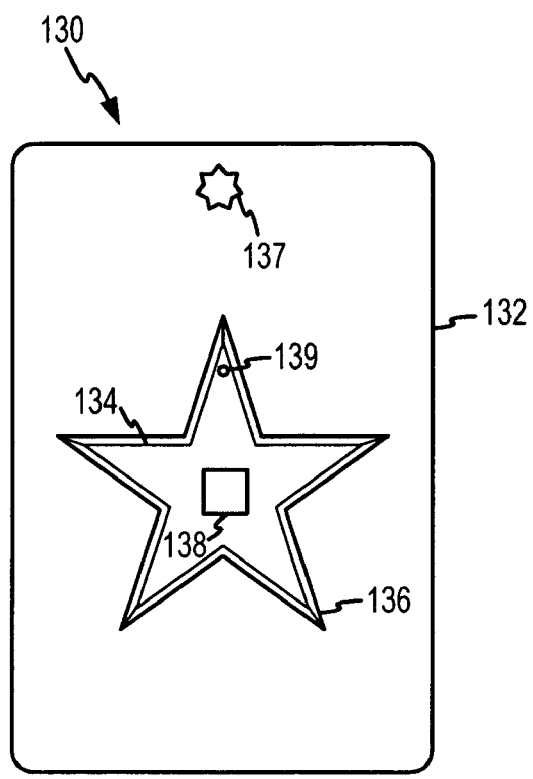
Figure 1D:
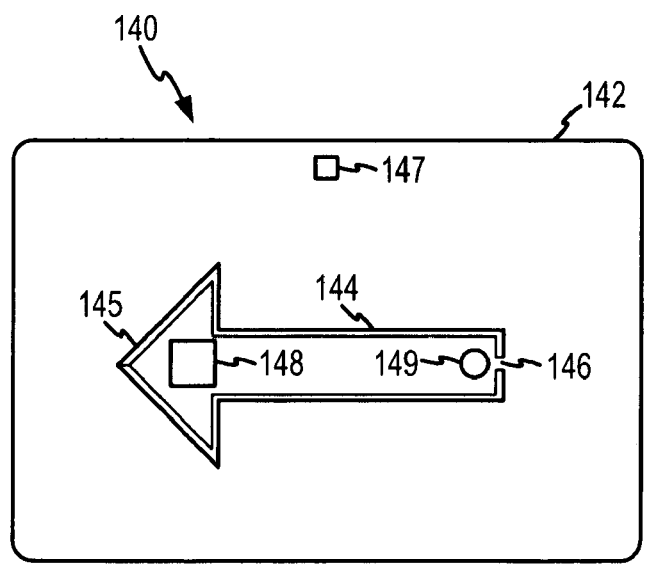

FIGS. 1B-D show additional embodiments of transaction card assemblies according to the invention. FIG. 1B shows a triangular shaped transaction card assembly 120 having three apertures 127A-C positioned near the three corners of the sheet 122. A circular shaped transaction card 124 is attached to the sheet 122 by tab 126. The circular transaction card 124 has a contactless IC chip 128, and may also include a star-shaped aperture 129 for coupling the card 124 to another object (e.g., a keychain).

FIG. 1C shows another embodiment of a transaction card assembly 130, which includes a star-shaped transaction card 134 attached to sheet 132. The transaction card 134 may be attached to the sheet 132 by tabs 136 located at each point of the star. The card 134 includes a contactless IC chip 138 to permit contactless transactions and an aperture 139. The sheet 132 also includes a star-shaped aperture 137.

FIG. 1D shows still another embodiment of a transaction card assembly 140, which includes an arrow-shaped transaction card 144 attached to sheet 142 by tabs 145 and 146. The card 144 includes a contactless IC chip 148 and a circular aperture 149. The sheet 142 also includes a square aperture 147.

Figure 1E:
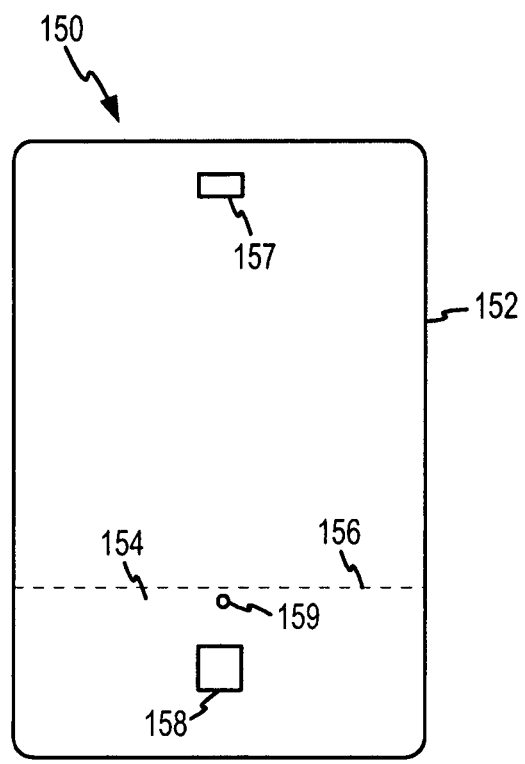

FIG. 1E shows another embodiment of a transaction card assembly 150, where less that the entire transaction card 154 is surrounded by sheet 152. In the embodiment shown, the transaction card 154 is coupled to the sheet 152 along perforation 156. The card 154 may be detached by bending along perforation 156 until the card 154 separates from the top portion of the sheet. The transaction card 154 includes a contactless IC chip 158 to permit contactless transactions and an aperture 159. The sheet 152 also includes a rectangular-shaped aperture 157.

Figure 1F:
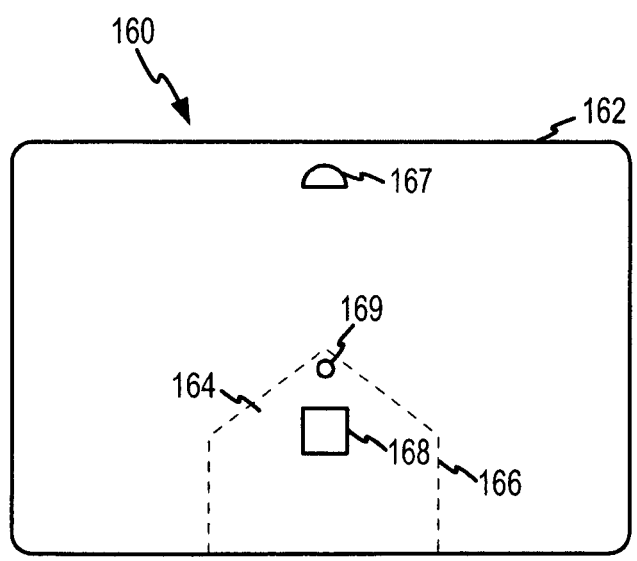

FIG. 1F shows yet another embodiment of a transaction card assembly 160, also having less than the entire transaction card 164 being surrounded by the sheet 162. The transaction card 164 is coupled to the sheet 162 along the perforation 166. The card 164 may be detached by pressing on the card to break it away from the sheet 162 along the perforation 166. The transaction card 164 includes a contactless IC chip 168 to permit contactless transactions and an aperture 169. The sheet 162 also includes a hemispherical-shaped aperture 167.

It will be appreciated that the data card may comprise a variety of other shapes not illustrated in FIGS. 1A-1F. The transaction card, for example, may have any rectangular, circular, semi-circular, elliptical, polygonal, etc., shape. The shape of the card may also be indicative of the business of a merchant, service provider, organization, etc. associated with transactions made with the card. For example, the card may have the shape of a store or restaurant front, houses, shoes, athletic equipment (e.g., football, baseball, tennis racket, hockey stick, etc.), food products (e.g., fruits, vegetables, pizza, donuts, hamburgers, etc.) beverage products, cars, animals (e.g., pets, livestock, etc.), cartoon characters, and consumer goods, among other shapes.

The present transaction cards may include a variety of sizes, including but not limited to, standard sized credit cards such as the 3⅜ inches by 2⅛ inches by 0.03 inches thick conventional CR-80 type card. Embodiments, for example, include transaction cards with a conventional rectangular shape, and dimensions of less than 3⅜ inches in width and less than 2⅛ inches in height, such as a minicard. The assemblies may also contain larger than standard-sized cards, provided the cards have a size that is practical for being carried in a purse, wallet, pants pocket, etc.

The transaction cards of the present invention may also have additional elements for transaction processing. These may include indicia on the transaction card such as alphanumeric characters that uniquely identify a transaction account associated with the card. They may also include a magnetic stripe to store card information such as a card number, which can be read by a magnetic card reader at a conventional POS terminal. The card may further include a bar code that has card information readable by a bar code scanner. In addition, the card may have a signature strip that can be signed by the cardholder.

The transaction card assemblies shown in FIGS. 1A-F may have advertising, branding, instructional information and other indicia. For example, the sheets may contain promotional information, trademarks, logos, graphics, website addresses, etc., associated with the vendors, merchants and/or service providers that sponsor or accept the transaction card. The indicia may be confined exclusively to the sheet portion of the transaction card assembly, or it may overlap both the sheet and the transaction card. For example, a focal point of a graphic may be centered on the transaction card while background scenery spills over onto the surrounding sheet, providing a larger sized display of the graphic on the overall card assembly.

Indicia may also be presented on opposite sides of the transaction card assembly. For example, the assembly may have a display side for promotional graphics and logos, and an instruction side that is opposite the display side that has instructional information, terms and conditions, etc. for using the transaction card, as well as information on how to remove the card from the card assembly. The sheet portion of the instruction side may also contain identification indicia such as a set of alpha-numeric characters and/or a bar code that uniquely identifies the assembly. The indicia may be included as part of the information used to activate the transaction card.

Figure 2:
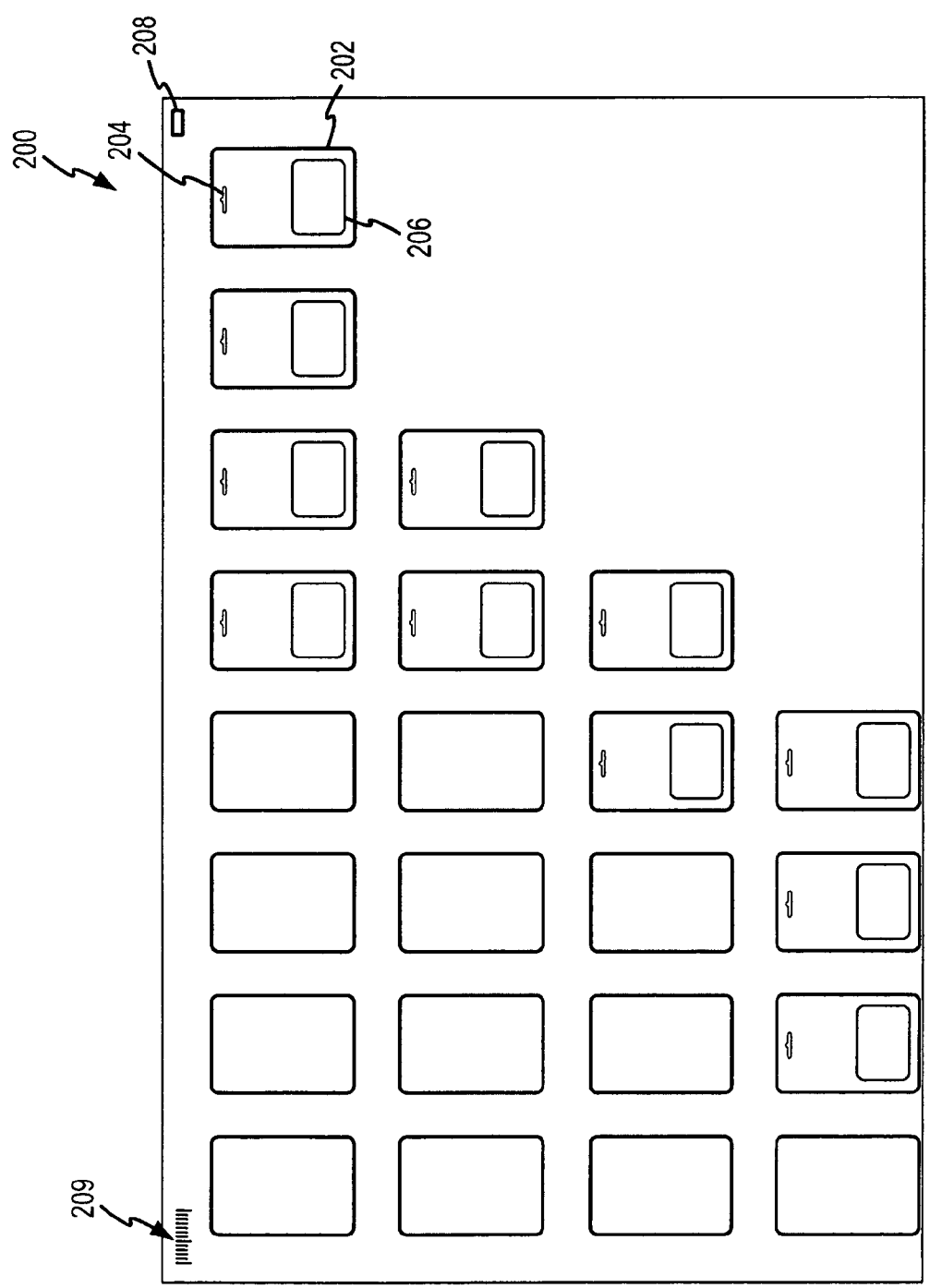
FIG. 2 is an overall view of a sheet of material for forming transaction card assemblies according to an embodiment of the present invention.

FIG. 2 is a schematic top view of a sheet of material 200 which contains a plurality of transaction cards 202. In many cases, the cards 202 are an integral part of sheet 200 and may later be stamped or cut out of sheet 200. As shown, cards 202 are generally rectangular in geometry (that is, this is their final shape after being removed from sheet 200). However, cards 202 may have essentially any size or shape, including any of those described herein. Cards 202 may conveniently include an opening 204 (when punched out) that permits card 202 to be hung from a J-hook, or the like. Each card 202 also includes a chip region 206 that contains electronics where personalization information will be electronically stored. Such electronics may comprise any type of memory device, such as a contactless payment chip, capable of having data written onto it, typically without physically contacting region 206. Such memory devices may include integrated circuit chips, contactless payment chips, RFID chips, and the like.

A wide variety of data may be stored on region 206, including the account holder's name, address, account number, current balance, recent purchases, loyalty information, and the like. Other information may include a unique chip number, cryptographic keys, spending limits, European MasterCard or VISA data, and the like.

Sheet 200 may be constructed of two pieces of plastic with RF modules or chips pressed in between. The RF modules are typically one to a card and spaced evenly over the sheet.

Prior to, or after, being initialized, sheet 200 may be provided with a host of other information. For example, printed on sheet 200 could be the name of the organization issuing the card, terms and conditions, disclaimers, advertising information. Also, each card could include some type of unique identifier printed on it that could later be checked with the data stored on the RF module to make sure the correct information was recorded. This identifier could be in a bar code information or other format capable of being read by optical character recognition (OCR) devices.

Also, sheet 200 could include some type of location mark 208 that permits sheet 200 to be properly aligned on a piece of equipment that separates cards 202 from sheet 200. For example, cards 202 could be removed using a die cutter, laser cutter or the like. Sheet 200 may also include a barcode mark 209 which identifies the sheet's identity and acts as a batch identifier.

Figure 3A:
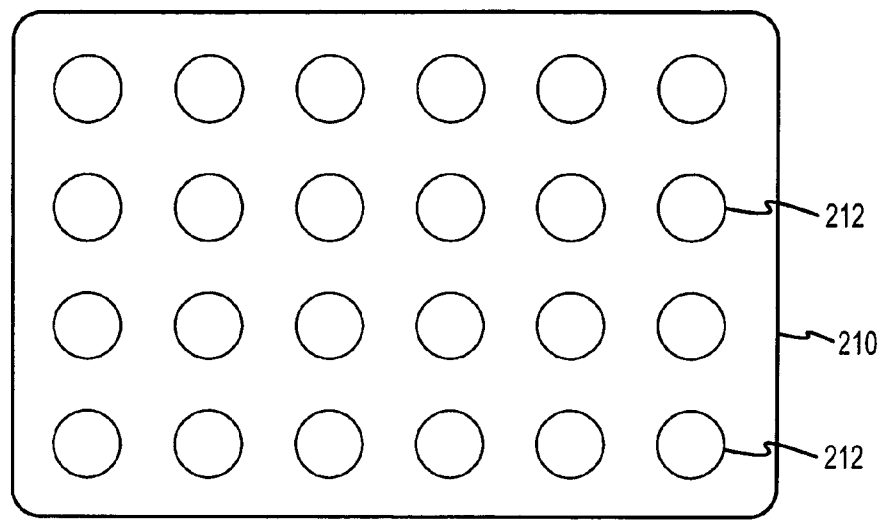
FIG. 3A is a simplified top view of an array of shells according to an embodiment of the present invention.

FIG. 3A is a top view of a device 210 for recording data and comprises an array of shells 212 that may be used to record data on an array of memory devices, such as an array of RF chips on sheet 200.

Each shell 212 may be concave in geometry and include a recording element for recording data on the contactless chips. Also, disposed around each shell 212 may be shielding to that when each of the recording devices is activated, it will not interfere with an adjacent chip. One advantage of using shells 212 is that manufacturers often produce cards with chips on a single sheet of material, and shells 212 permit each of them to be personalized while still attached to the same sheet, thereby decreasing the time it takes to personalize the cards.

Figure 3B:
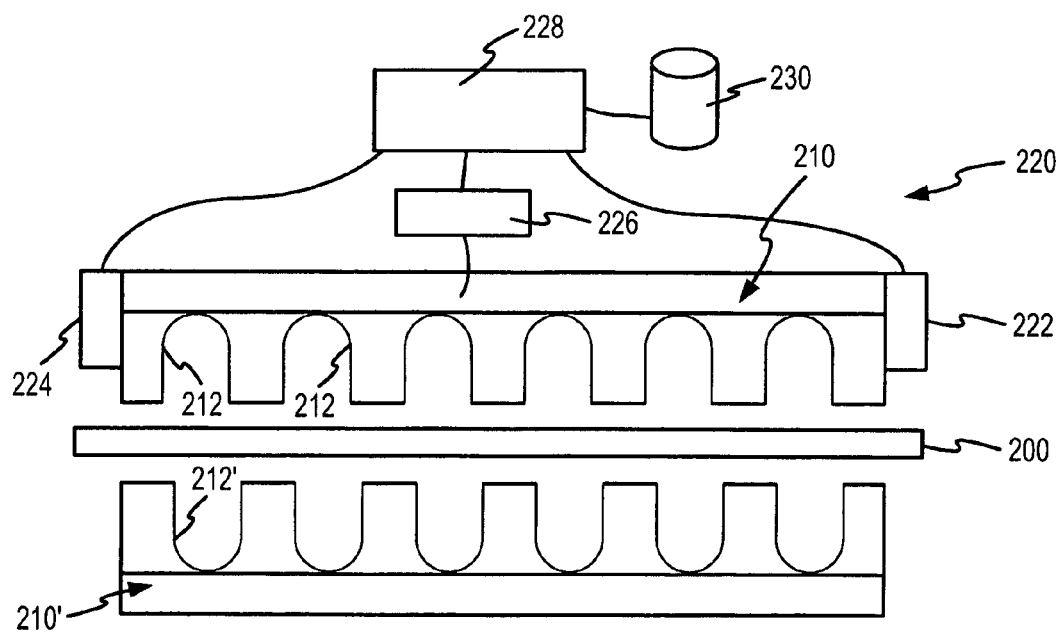
FIG. 3B is a simplified side view of a system for personalizing transaction cards according to an embodiment of the present invention.

As best shown in FIG. 3B, device 210 may be included as part of an initialization system 220. Device 210 is positioned over sheet 200 (see FIG. 2) such that each shell 212 is positioned above one of the cards 202. Optionally, a second recording device 210' could be positioned below sheet 200 to facilitate initialization if the contactless chips are positioned underneath sheet 200, or in some cases could be used to double throughput if two sheets were used. Also, system 220 may include a holding apparatus for holding sheet 200 in the appropriate location.

System 220 may include one or more bar code readers 222 and/or optical character readers 224. These readers are used to read information off sheet 200. For example, sheet 200 could include an identifier such as barcode mark 209 that is associated with specific chips included on that particular sheet. Or, each card 202 could include a separate identifier. In this way, the identifiers may be read by readers 222 or 224 as a quality assurance measure to make sure the proper information is stored on the appropriate card 202. Also, sheet 200 could include a locator mark (such as mark 208) that may be read by reader 224 to permit sheet 200 to be properly oriented with respect to shells 212.

Also included in system 220 is an RF generator 226 that is used to supply RF signals to each of the shells 212. More specifically, each shell 212 includes an antenna that is energized with energy from generator/receiver 226 in order to record data on the RF chips on sheet 200.

Central to system 220 is a controller 228 that has an associated database 230. Stored in database 230 is a record of information that is to be recorded on each contactless chip. Also, database 230 may include unique identifiers for each sheet or each card so that after data is written to each chip, a quality assurance check may be done by reading the identifier and reading the data recorded on the RF chip to make sure they are the same.

Controller 228 controls operation of system 220 by taking information from database 230 and controlling operation of energizer/receiver 226 so that the correct data is stored on each RF chip. Controller 228 may also be used to control operation of one or more of the following: advancement of sheets along a conveyor so that they are properly positioned beneath shells 212, the lowering of device 210 so that each shell covers the appropriate card, updating of database 230 once data has been recorded and/or checked for accuracy, controlling a cutter that is used to cut out the cards, and the like.

Figure 4A:
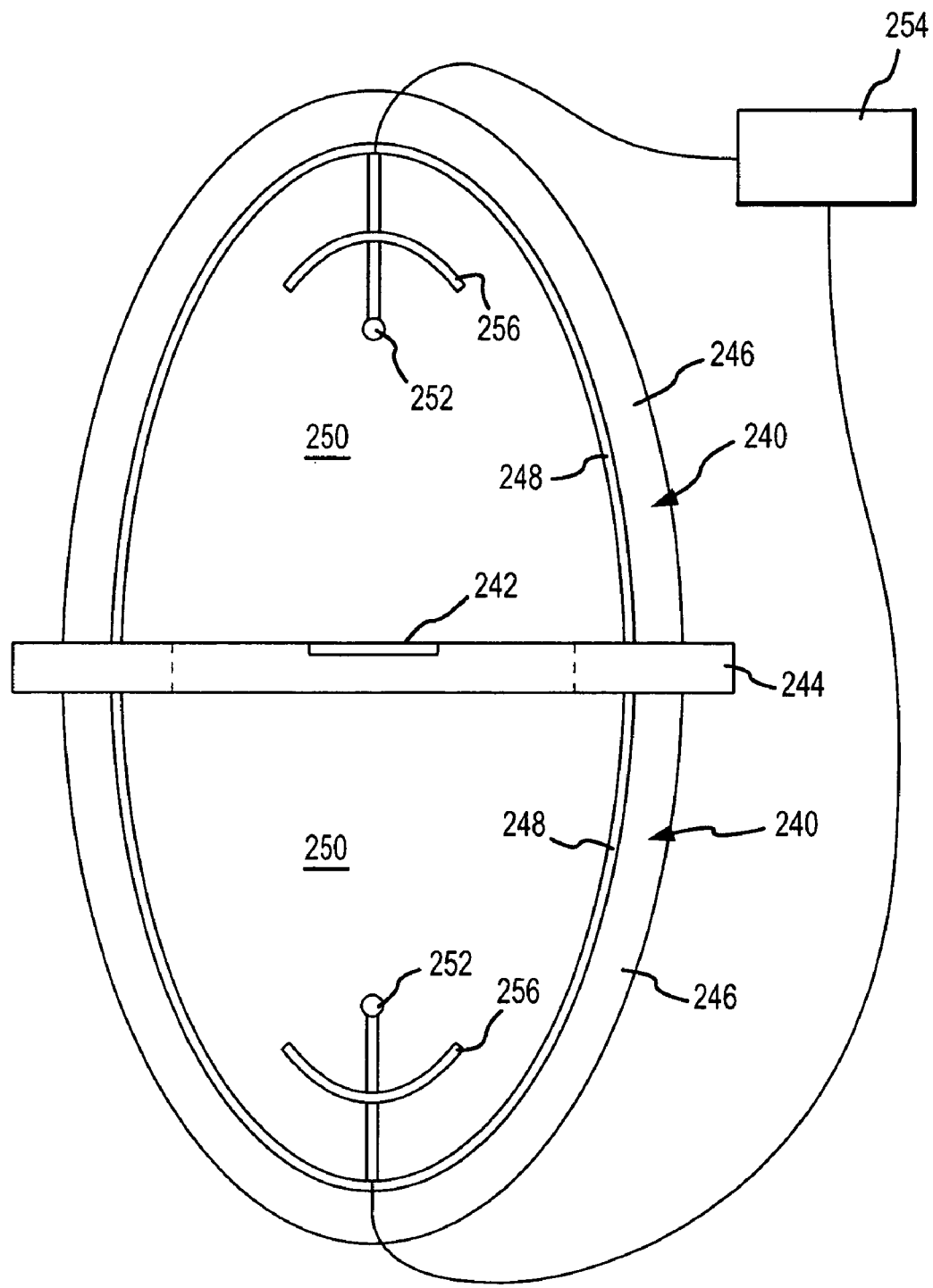
FIGS. 4A and 4B are simplified cross sectional views of shells according to alternative embodiments of the present invention.

FIG. 4A illustrates an exemplary embodiment of a shell 240 that may be used to write data to and read data from RF chip 242 that is incorporated into a sheet 244 having multiple cards similar to other embodiments. As such, it will be appreciated that shell 240 may be incorporated into an array of similar shells. Shell 240 is constructed in the shape of a parabolic dish and is constructed of an outer layer 246 that may be a plastic, ceramic, or the like. Lining outer layer 246 is an inner layer 248 that may comprise a Faraday Cage screen, such as a layer of copper, to prevent RF radiation from leaking outside of shell 240. Shell 240 is sized so that it may rest directly on sheet 244 and completely enclose chip 242.

Extending into an interior space 250 of shell 240 is an antenna 252 that in turn is coupled to a RF transceiver 254 that permits RF energy to be supplied into interior space 250 to record data onto chip 242. In some cases, data could also be read from chip 242 using antenna 252 and transceiver. Optionally, a parabolic reflecting surface 256 may be provided to focus or direct the RF energy onto chip 242.

Optionally a bottom shell 240 that is identical to the top shell may also be provided. This permits a second antenna to be used if the chip's antenna is positioned on the bottom of sheet 244. In this way, transceiver 254 may be used to activate only the bottom antenna.

Figure 4B:
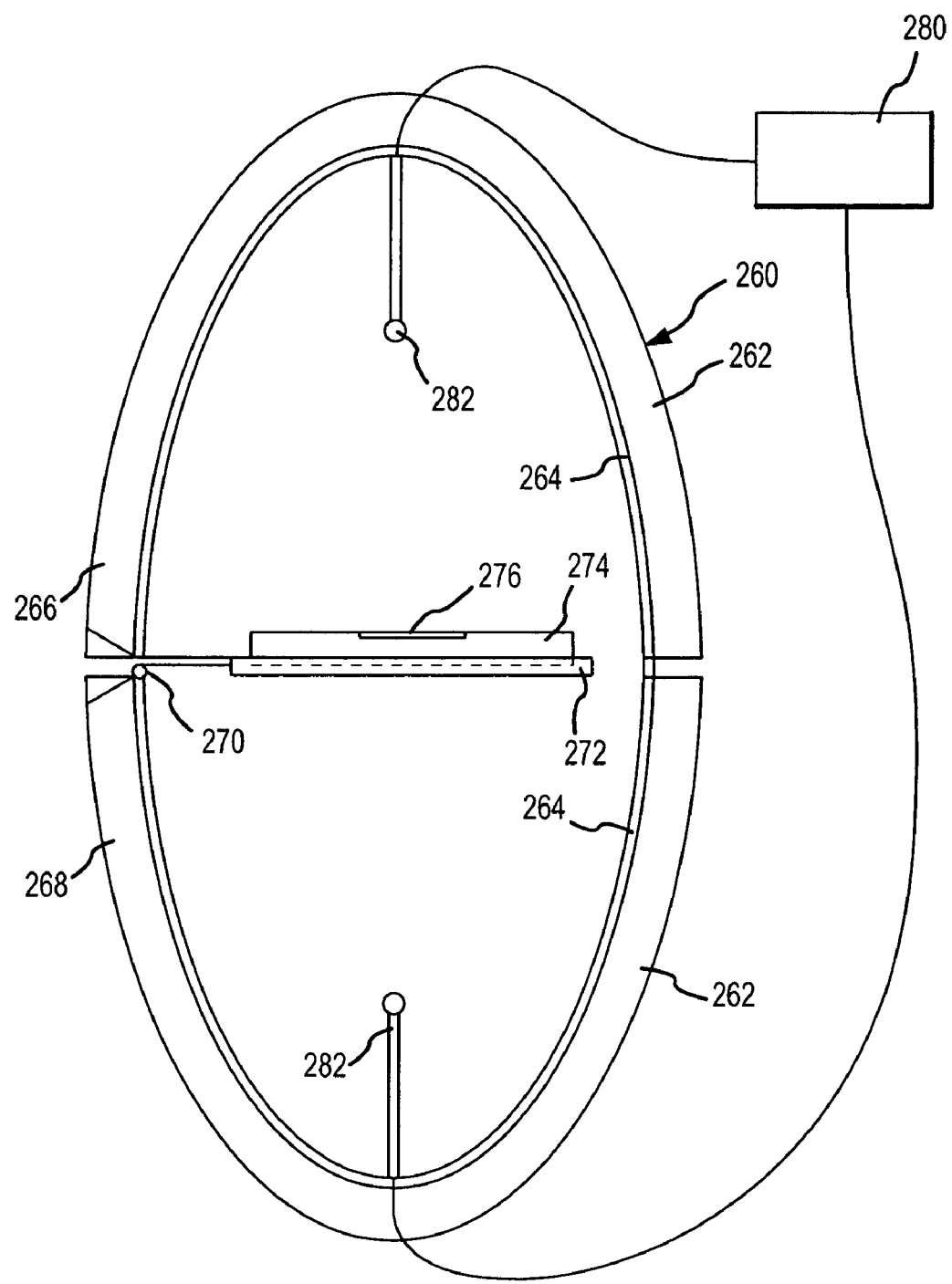

Referring now to FIG. 4B, an alternative embodiment of a shell 260 will be described. Shell 260 is constructed of an outer layer 262 and an inner layer 264 comprising a Faraday shield similar to shell 240. Shell 260 is different in that it includes an upper half 266 and a lower half 268 that are coupled by a hinge 270. Also, shell 260 includes a card holder 272 for holding a card 274 having an RF chip 276. In this way, shell 260 may be used to personalize individual cards 274 that have already been cut out of a sheet (or manufactured as a separate card). In use, card 276 is placed on holder 272 while halves 266 and 268 are pivoted open about hinge 270. When in place, halves 266 and 268 are closed so that the Faraday shield 264 completely encloses card 274. A radio transceiver 280 may then be used to actuate antennas 282 to record data onto RF chip 276 similar to other embodiments. Optionally, shell 260 could also use a parabolically shaped reflecting surface similar to shell 240. Also, as with shell 240, only one of the halves of shell 260 could be used, depending on where RF chip 276 is located. For example, half 266 could simply be placed over card 274 as it passes along a conveyor. Also, an array of shells 260 could be used to personalize an array of cards 274 at the same time.

Figure 5:
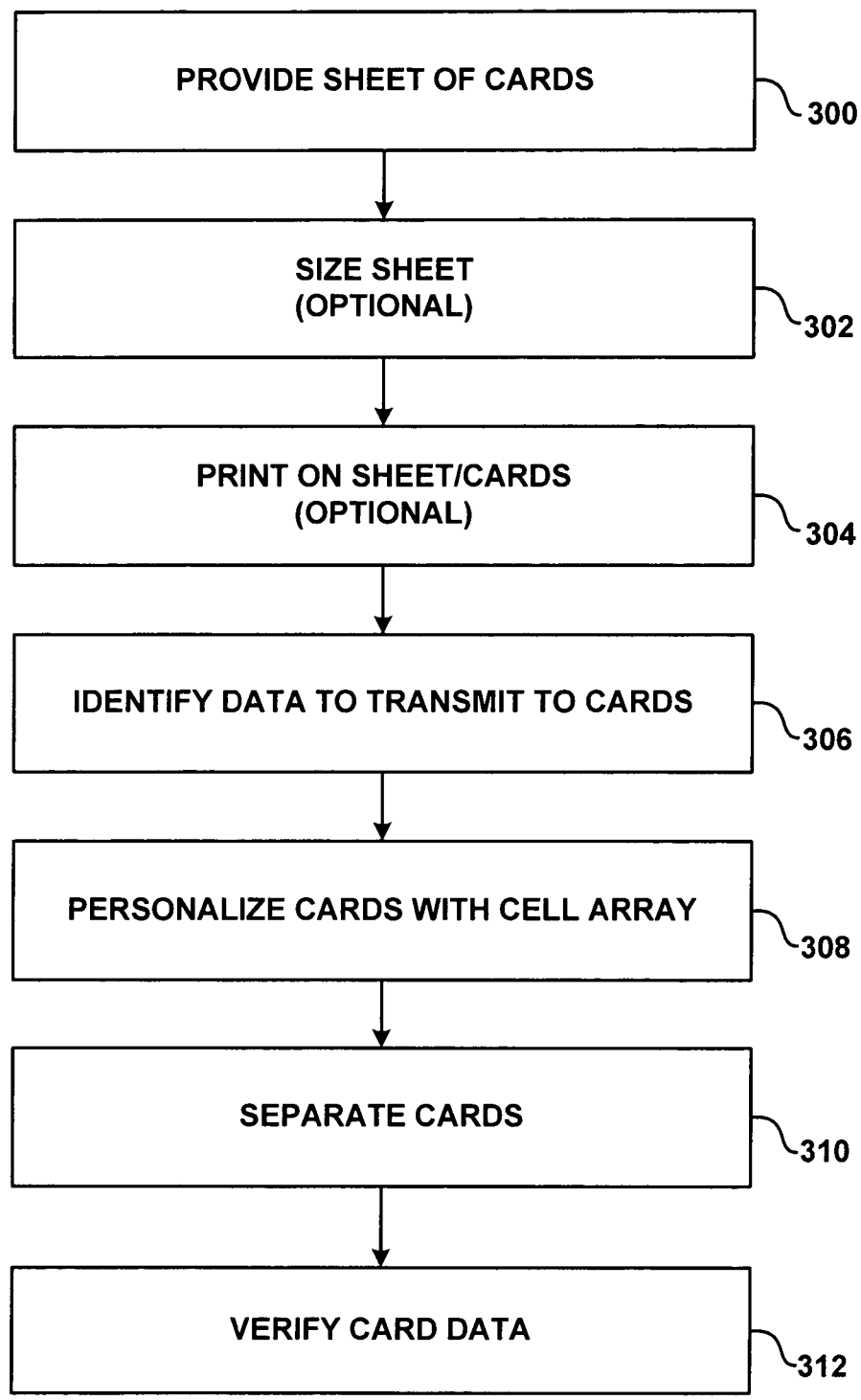
FIG. 5 is a flowchart illustrating a method of personalizing transaction cards according to an embodiment of the invention.

Referring now to FIG. 5, one exemplary method for manufacturing and personalizing cards will be described. The process begins by obtaining a sheet of cards with contactless chips as illustrated in step 300. One example of such a sheet is a sheet of plastic material having an array of RF chips, as manufactured by Texas Instruments. In some cases, the sheet may be cut down to a specific size so that it may fit within a printer, such as a die sublimation printer as shown in step 302. Once in the printer, various information may be printed on the sheet as shown in step 304. For example, each individual card may be printed with colors, logo, photographs, text and the like. Also, any personalized data could be added including a recipient's name, an account number, a bar code for identifying the card later in the process and the like. Further, on a scrap piece of the plastic sheet, one or more " registration mark's may be printed. These marks may be used to align the sheet in a die cutter when the cards are cut out from the sheet. Also, an identifier could be printed on the sheet to identify the sheet. Once the printing is finished, the sheet may be removed from the printer and allowed to dry. If a UV ink is used, the sheet may be placed on an infra-red drying table. Once the ink is dry, the sheet may be placed into a personalization device, such as any of those described herein.

As shown in step 306, the data that is to be stored on each card is identified. This may be done by reading the identifier on the sheet (or on each card). A database is accessed to retrieve the data to be recorded on each RF chip, such as accounting numbers, name, address and the like. In step 308, each of the cards is personalized using a cell array, including any of those described herein. In this way, each of the RF chips on the sheet may be simultaneously personalized.

After personalization, the sheet may be removed from the personalization device, and the sheet (or multiple sheets) may be placed in a die cutter to separate the cards (see step 310). The die cutter may align the sheets using the alignment marks and then cuts out each card.

Various quality assurance checks may be performed following personalization as shown in step 312. For example, the cards may be stacked in a hopper and then individually fed onto a conveyor belt. A reader reads the information off each RF chip (by energizing the RF antenna) and the unique identifier printed on the cards is also read (by a bar code reader, OCR reader or the like). The information from the unique identifier printed on the card is compared with what is on the chip to make sure they are consistent.

As one alternative process, the cards could also be personalized after they are cut out from the sheet. In such cases, steps 300-304 are performed as described above. At that point, the sheets may be placed in a die cutter and cut. The individual cards may then be placed in a hopper and individually fed onto a conveyer belt. The unique identifier may be read from each card, a look-up performed, and personalization data recorded on the RF chip. To do so, any of the devices described herein may be used. Also, in some cases, a simple RF antenna may be used. When finished, a quality assurance process similar to that previously described may be used.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific examples, but rather is to be accorded the scope represented in the following claims.

What is claimed is:

1. A system for personalizing a plurality of transaction cards, comprising:
   an array of shells adapted to engage a sheet having a plurality of transaction cards, wherein each of the shells comprise an antenna adapted for transmitting data to one of the cards;
   an orientation detector adapted for determining an orientation of the sheet relative to the array of shells; and
   a controller coupled to the array of shells and adapted for directing operation of the antennas.

2. The system as in claim 1 further comprising a base adapted to engage an opposing surface of the sheet of transaction cards so that the sheet is disposed between the base and the array of shells.

3. The system as in claim 2 wherein the base comprises a second array of shells, wherein at least one of the shells in the second array comprises an antenna adapted for transmitting data to one of the cards.

4. The system as in claim 1 further comprising a database coupled to the controller, the database comprising data to be transmitted to the cards.

5. The system as in claim 1 wherein the controller is adapted to direct transmissions from at least some of the plurality of antennas to at least some of the plurality of transaction cards simultaneously.

6. The system as in claim 1 further comprising a reader adapted to read an indicator disposed on the sheet of transaction cards.

7. The system as in claim 6 wherein the reader comprises a bar code reader and the indicator comprises a bar code.

8. The system as in claim 1 further comprising a transceiver coupled to the controller and to the array of shells, the transceiver adapted to transmit data to at least some of the antennas for transmission to at least some of the transaction cards.

9. The system as in claim 8 wherein the transceiver comprises a radio transceiver and the antennas comprise RF antennas.

10. The system as in claim 1 wherein the transaction cards each comprise a contactless integrated circuit that is adapted to communicate with a card reader.

11. The system as in claim 1 wherein at least one of the shells comprises a reflector adapted to reflect a transmission from the antenna towards one of the cards.

12. The system as in claim 11 wherein the reflector comprises a parabolic reflector.

13. The system as in claim 1 wherein the shells comprise parabolic shells.

14. The system as in claim 1 wherein the shells further comprise a shield adapted to prevent transmission interference from antennas in adjacent shells in the array of shells.

15. The system as in claim 14 wherein at least some of the shells comprise an electrically non-conductive body having a Faraday cage.

16. A system for personalizing a transaction card, comprising:
a controller;
a shell having a first half and a second half, wherein the first half comprises an antenna coupled to the controller, the antenna adapted for transmitting data to the transaction card, and wherein the first half and the second half each have a shield adapted to prevent the transmission of data through the shell halves; and
a card holder adapted to hold a transaction card between the first shell half and the second shell half;
wherein the first and second shell halves are adapted to close around the transaction card prior to operation of the antenna.

17. The system as in claim 16 wherein the antenna comprises an RF antenna, and the transaction card comprises an RFID.

18. The system as in claim 16 wherein the two halves are rotatably coupled together.

19. The system as in claim 16 further comprising first and second arrays of shells adapted to receive therebetween a sheet comprising a plurality of transaction cards.

20. A method of personalizing transaction cards, the method comprising:
providing a sheet having a plurality of transaction cards;
engaging a first surface of the sheet with an array of shells so that the shells are aligned with the transaction cards, and wherein at least some of the shells comprise an antenna adapted for transmitting data;
identifying a plurality of data sets, with each data set intended to be transferred to one of the transaction cards; and
engaging the antennas to transfer the plurality of data sets to the transaction cards.

21. The method as in claim 20 further comprising engaging a second surface of the sheet with a base.

22. The method as in claim 21 wherein the base comprises a second array of shells.

23. The method as in claim 21 further comprising separating the transaction cards from the sheet.

24. The method as in claim 21 further comprising printing information on the transaction cards.

25. The method as in claim 24 wherein the information is selected from a group of information consisting essentially of a customer name, an account number, a bar code, and a card issuer identifier.

26. The method as in claim 24 further comprising verifying the information printed on the transaction card matches the data set transferred to the card by the antenna.

27. The method as in claim 20 further comprising determining an orientation of the sheet relative to the array of shells.

28. The method as in claim 20 further comprising reading a sheet identifier from the sheet.

29. The method as in claim 28 further comprising transmitting the sheet identifier to a controller, wherein the controller identifies the plurality of data sets based at least in part on the sheet identifier.

* * * * *